Nov. 21, 1933.  C. WASHBURN  1,935,681
LICENSE TAG
Filed Feb. 4, 1933
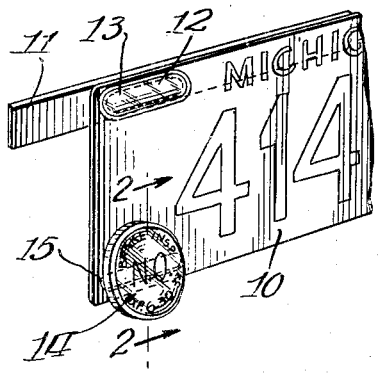
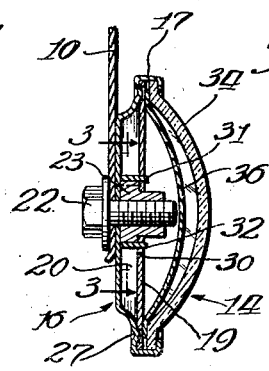
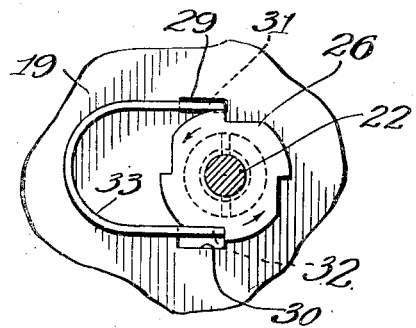
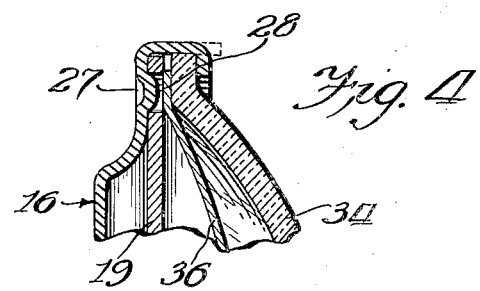
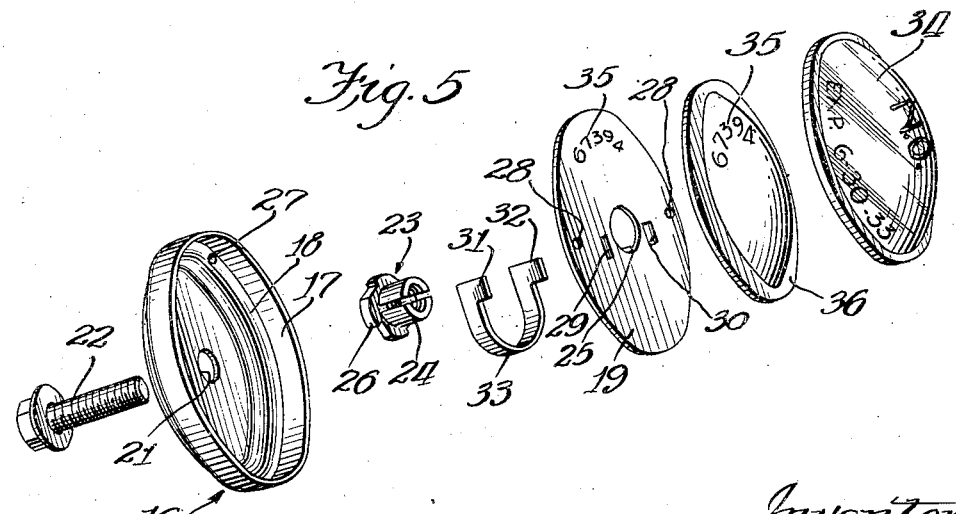
Inventor:
Clyde Washburn
By Williams, Bradbury, McCaleb & Hinkle
Attys.

Patented Nov. 21, 1933

1,935,681

UNITED STATES PATENT OFFICE 1,935,681

LICENSE TAG

Clyde Washburn, Memphis, Tenn., assignor to Clyde Washburn Company, Memphis, Tenn., a corporation of Tennessee Application February 4, 1933. Serial No. 655,142

9 Claims. (Cl. 40—125)

This invention relates to license tags and similar legend-bearing devices which may or may not be official, for example, official tokens indicating brake tests and other official inspections, and membership of the owner in various associations.

For convenience hereinafter, the device will be referred to as a license tag, but it will be understood that such term is not intended to be limitative of the invention in any respect.

One of the objects of the invention is to provide an improved tag which can be applied to an automobile and cannot be removed therefrom without irreparable damage to the tag.

A further object of the invention is to provide a tag which can readily be applied in desired position and which cannot be removed without the destruction of a portion thereof bearing indicia.

A further object of the invention is to provide a tag of this construction which can readily be manufactured and assembled.

Further objects, advantages and capabilities of the invention will readily appear from the following description of a preferred embodiment thereof, taken in conjunction with the accompanying drawing, in which Figure 1 is a fragmentary view of an automobile license plate having a tag, embodying the invention, secured thereto;

Fig. 2 is a sectional view through the tag on a larger scale, the same being taken on the line 2—2 of Fig. 1;

Fig. 3 is a sectional detail view taken on the line 3—3 of Fig. 2;

Fig. 4 is a sectional detail on a still larger scale, and

Fig. 5 is an exploded view of the tag showing the manner in which the same is assembled.

Referring to the drawing, the reference numeral 10 indicates a conventional automobile license plate which is secured to a bar 11 of an automobile by means of securing means 12, which may suitably be of the type described and claimed in Patent No. 1,855,931, issued April 26, 1932, to the present applicant; that is, the fastening 12 preferably comprises a fragile closure 13 of glass or other frangible material which must be destroyed before the plate 10 can be removed.

The improved tag is indicated by the reference numeral 14 and it is shown in Fig. 1 mounted in opening 15 in the plate 10. It will be understood that the tag 14 may be mounted in the position of the securing means 12 and may serve the double function of serving as a tag and also securing the plate 10 to the bar 11 in a manner which provides great security against the theft of the plate 10.

The tag 14 comprises a base 16 which is initially in the form of a shallow dish having a substantially cylindrical wall 17 and a bottom which provides a peripheral shoulder 18 adjacent the lower edge of the wall 17. The central portion of the bottom is dished still further so as to provide a central portion which extends substantially beyond the circumferential shoulder 18. This central dished portion of the base 16 provides with a plate 19, which will hereinafter be more fully described, a chamber 20 in the assembled tag. The base 16 is provided with a central opening 21 through which a bolt 22 is passed when the tag is being mounted in position, or is being used for securing a plate 10 or other element to an automobile. The bolt 22 is adapted to be threaded into a nut 23 which is provided with a reduced cylindrical portion 24 which is adapted to extend through a central opening 25 in the plate 19. The remainder of the nut 23 is in the form of a ratchet 26 which is adapted to have a snug working fit in the chamber 20, the reduced cylindrical portion 24 projecting through the opening 25 away from the base 16. The cylindrical portion 24 is sufficiently large to project through the plate 19 sufficiently to enable it to be engaged by a wrench or the like during the removal of the bolt 22.

The plate 19 is substantially of the same diameter as the base 16 so that when it is inserted thereinto, its marginal portion rests upon the shoulder 18 providing the chamber 20 hereinbefore referred to. The base 16 is provided in its shoulder portion 18 with deformations 27 which project inwardly. The plate 19 is provided with openings 28 which are adapted to receive the projections 27 in the manner best shown in Fig. 4, and thus prevent the plate 19 from rotating after the tag has been assembled.

On either side of the opening 25, the plate 19 is provided with openings 29 and 30 which are adapted to receive tongues 31 and 32 which project laterally from the ends of the horseshoe spring 33. The opening 29 is relatively narrow so that the tongue 31 has practically no degree of freedom therein. The opening 30 is relatively wide in the radial direction of the tag so that the tongue 32 may move away from and towards the center of the nut 23. The position of the openings 29 and 30 and the plate 19 is such that the ends of the horseshoe spring 33 are located on either side of the ratchet portion 26, as best shown in Fig. 3. The end of the spring adjacent the tongue 31 clears the ratchet portion 26, whereas the end of the spring 33 adjacent the tongue 32 is adapted to bear against the periphery of this ratchet portion. It will readily be understood from Fig. 3 that the ratchet teeth of the element 26 are arranged so that rotation of the nut 23 is prevented by the spring 33 when the bolt 22 is advanced or rotated in the clockwise direction. This corresponds to the mounting of the tag in its position by screwing the bolt 22 into the nut 23 after passing the bolt through suitable opening, such as the opening 15 in the plate 10. If an attempt is made to remove the bolt 22 by rotating it in the reverse direction, the friction between the bolt and the nut 23 causes the latter element to rotate with the bolt in the counter-clockwise direcion, as viewed in Fig. 3. It will readily be understood from this figure that the rotation of the nut 23 merely oscillates the free end of the spring 33 and is incapable of freeing the bolt from the nut 23.

In order to prevent access from the outside, whereby the cylindrical portion 24 of the nut 23 might be held, a cover 34 of glass or other frangible material is provided. This cover is preferably bellied outwards in the center and is provided with a marginal surface adapted to enter within the cylindrical wall of the base 16. Final assembly is completed by spinning or bending the outer edge of the wall 17 over upon the outer marginal surface of the cover 34.

The frangible cover 34 preferably carries indicia which it is desired to display. Thus, in the case of a license tag or a brake inspection tag, the cover 34 may have molded therein letters indicating the governing body which issues it, and also the nature of the certificate it represents and the date of its expiry. In the case of many tags and certificates it is preferred to provide a serial number. The provision of a serial number on material such as glass presents great practical difficulties and it is preferred, therefore, to provide the serial number in an element within the tag, for example the number may be stamped on the plate 19, as shown at 35 in Fig. 5.

The glass 34 may be of distinctive color, for example red and green, and the tag may be adapted to serve as a reflector which is visible at night when a beam from an automobile headlight shines upon it. For this purpose the plate 19 may have a surface which is highly reflecting, for example the plate 19 may be cadmium plated.

If desired, the appearance presented by the cylindrical portion 24 of the nut 23 projecting through the opening 25 of the plate 19, and the tongues 31 and 32 projecting through the openings 29 and 30, may be hidden from view by the intervention of a disk 36 of paper or other suitable material. As shown in Fig. 5, the disk 36 may have the distinguishing number 35 impressed or imprinted thereon so that the same may be visible through the frangible cover plate 34.

It will readily be understood that when the bolt 22 is tightened up into the nut 23, it can only be removed therefrom after the destruction of the cover plate 34 and the removal of the disk 36, if such is used. When this has been done, the cylindrical end 24 may be grasped by a pair of pliers and the bolt 22 may be screwed out.

It will thus be understood that I have provided a tag which is practically theft-proof and which can be used not only for the purposes of a tag but also for a theft-proof fastening for an automobile plate or the like. The device is very easily made and assembled. It is to be noted that during assembly the spring 33 is held in position by merely passing the ends 31 and 32 into the openings 29 and 30. The edges of the spring 33 bear against the central portion of the base 16 and the inner side of the plate 19. This restraint of the spring 33, together with its horseshoe shape and the engagement of its tongues within the openings in the plate 19, combine to keep the spring 33 in operative position without the necessity of rigidly securing it to any element of the tag.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A license tag comprising a dished metal base, a metal plate resting within said base so as to constitute a compartment between it and the base, means for preventing rotation of the plate with respect to the base, a frangible cover permanently secured to said base, a nut enclosed between said base and said cover having a rotatable mounting on said plate, and spring means associated with said plate for preventing rotation of the nut in one direction, said base having an opening for the admission of a bolt into said nut.

2. A license tag comprising a base, a frangible cover for said base irremovable therefrom except by mutilation of the base or fracture of the cover, a nut mounted between the base and cover, means preventing rotation thereof in one direction, said frangible cover having inherent therein indicia, and means within the cover carrying further indicia.

3. A license tag comprising a base, a plate secured within said base in non-rotatable relationship, a nut mounted within said base, a horseshoe spring adapted to engage said nut to prevent rotation in one direction, said horseshoe spring standing on edge between the base and plate and having projections extending into openings in the plate, and a frangible cover permanently secured to said base to enclose said nut, plate and spring between the cover and the base, said base being provided with an opening through which a bolt is adapted to be threaded into said nut.

4. A license tag comprising a metal base of dish-like formation, the bottom thereof being provided with a peripheral shoulder, the central portion extending below said shoulder, projections on said shoulder extending inwardly of the dish, a plate located within said base and having openings receiving said projections, said plate having a central opening and a relatively narrow and a relatively broad opening on either side of said central opening, a nut having a ratchet portion located between the plate and the central portion of the base in alignment with an opening therein and in alignment with the central opening in the plate, said nut comprising a portion extending outwardly through last said opening, a substantially horseshoe spring having edge contact with the base and with the plate and having outward projections into the relatively narrow and relatively broad openings, the end of the spring associated with the relatively broad opening being adapted to engage the ratchet portion of the nut to hold the nut against rotation when a bolt is screwed into said nut, and a glass cover superimposed on said plate being thereagainst by an inturned edge of the base.

5. A license tag comprising a metal base of dish-like formation, the bottom thereof being provided with a peripheral shoulder, the central portion extending below said shoulder, projections on said shoulder extending inwardly of the dish, a plate located within said base and having openings receiving said projections, said plate having a central opening and a relatively narrow and a relatively broad opening on either side of said central opening, a nut having a ratchet portion located between the plate and the central portion of the base in alignment with an opening therein and in alignment with the central opening in the plate, said nut comprising a portion extending outwardly through last said opening, a substantially horseshoe spring having edge contact with the base and with the plate and having outward projections into the relatively narrow and relatively broad openings, the end of the spring associated with the relatively broad opening being adapted to engage the ratchet portion of the nut to hold the nut against rotation when a bolt is screwed into said nut, and a glass cover superimposed on said plate being held thereagainst by an inturned edge of the base, said glass cover having formed therein indicia and said plate bearing indicia.

6. A license tag comprising a metal base of dish-like formation, the bottom thereof being provided with a peripheral shoulder, the central portion extending below said shoulder, projections on said shoulder extending inwardly of the dish, a plate located within said base and having openings receiving said projections, said plate having a central opening and a relatively narrow and a relatively broad opening on either side of said central opening, a nut having a ratchet portion located between the plate and the central portion of the base in alignment with an opening therein and in alignment with the central opening in the plate, said nut comprising a portion extending outwardly through last said opening, a substantially horseshoe spring having edge contact with the base and with the plate and having outward projections into the relatively narrow and relatively broad openings, the end of the spring associated with the relatively broad opening being adapted to engage the ratchet portion of the nut to hold the nut against rotation when a bolt is screwed into said nut, a disk superimposed on said plate, and a glass cover superimposed on said plate being held in position by an inturned edge of the base, said glass cover having indicia formed therein and said disk having indicia thereon.

7. A license tag comprising a base, a frangible cover for said base irremovable therefrom except by mutilation of the base or fracture of the cover, a nut mounted between the base and cover, means preventing rotation thereof in one direction, and means within said base and said cover bearing indicia.

8. A license tag comprising a metal base, a frangible transparent cover permanently secured to said base, means within the base and cover bearing indicia and securing means within the base and cover, said indicia being protected from alteration or removal and said securing means being protected from actuation for removal of the tag without the destruction of the base or cover.

9. A license tag comprising a metal base, a frangible transparent cover permanently secured to said base, means within the base and cover bearing indicia, threaded securing means within the base and cover, said indicia being protected from alteration or removal and said threaded securing means being protected from actuation for removal of the tag without the destruction of the base or cover.

CLYDE WASHBURN.